(12) United States Patent
He

(10) Patent No.: US 10,548,012 B2
(45) Date of Patent: *Jan. 28, 2020

(54) METHOD, SYSTEM AND APPARATUS FOR NEGOTIATING SECURITY CAPABILITIES DURING MOVEMENT OF UE

(71) Applicant: HUAWEI TECHNOLOGIES CO., LTD., Shenzhen, Guangdong (CN)

(72) Inventor: Chengdong He, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/408,684

(22) Filed: Jan. 18, 2017

(65) Prior Publication Data

US 2017/0127284 A1 May 4, 2017

Related U.S. Application Data

(63) Continuation of application No. 14/728,687, filed on Jun. 2, 2015, now Pat. No. 9,572,027, which is a (Continued)

(30) Foreign Application Priority Data

Sep. 29, 2007 (CN) .......................... 2007 1 0181068

(51) Int. Cl.
*H04L 29/00* (2006.01)
*H04W 12/08* (2009.01)
(Continued)

(52) U.S. Cl.
CPC ............. *H04W 12/08* (2013.01); *H04L 63/06* (2013.01); *H04L 63/083* (2013.01);
(Continued)

(58) Field of Classification Search
CPC .... H04L 63/205; H04W 12/04; H04W 80/02; H04W 60/04; H04W 88/12; H04M 1/66
See application file for complete search history.

(56) References Cited

U.S. PATENT DOCUMENTS 6,028,933 A 2/2000 Heer et al.
7,190,793 B2 3/2007 Hsu
(Continued)

FOREIGN PATENT DOCUMENTS

CN 1455556 A 11/2003
CN 1589060 A 3/2005
(Continued)

OTHER PUBLICATIONS

3rd Generation Partnership Project; Technical Specification Group Services and System Aspects; Rationale and track of security decisions in Long Term Evolved (Release 8); 3GPP Standard: 3GPP TR 33.821 V0.4.0, Jul. 2007.*
(Continued)

*Primary Examiner* — Don G Zhao
(74) *Attorney, Agent, or Firm* — David William Roe

(57) ABSTRACT

A method for negotiating security capabilities during movement of a User Equipment (UE) includes the following steps: a target network entity receives a Routing Area Update (RAU) Request from the UE; the entity obtains Authentication Vector (AV)-related keys deduced according to a root key, and sends the selected security algorithm to the UE; and the UE deduces the AV-related keys according to the root key of the UE. A system, SGSN, and MME for negotiating security capabilities during movement of a UE are also disclosed. The present invention is applicable to security capability negotiation between the UE and the network.

20 Claims, 9 Drawing Sheets

Related U.S. Application Data continuation of application No. 12/717,385, filed on Mar. 4, 2010, now Pat. No. 9,060,268, which is a continuation of application No. PCT/CN2008/072486, filed on Sep. 24, 2008.

(51) Int. Cl.

| | | |
|---|---|---|
| *H04L 29/06* | (2006.01) | |
| *H04W 60/04* | (2009.01) | |
| *H04W 12/04* | (2009.01) | |
| *H04M 1/66* | (2006.01) | |
| *H04W 8/02* | (2009.01) | |
| *H04W 8/22* | (2009.01) | |
| *H04W 12/06* | (2009.01) | |
| *H04W 80/02* | (2009.01) | |
| *H04W 88/12* | (2009.01) | |

(52) U.S. Cl.
CPC .......... *H04L 63/107* (2013.01); *H04L 63/205* (2013.01); *H04M 1/66* (2013.01); *H04W 8/02* (2013.01); *H04W 8/22* (2013.01); *H04W 12/04* (2013.01); *H04W 12/06* (2013.01); *H04W 60/04* (2013.01); *H04W 80/02* (2013.01); *H04W 88/12* (2013.01)

(56) References Cited

U.S. PATENT DOCUMENTS

| | | | |
|---|---|---|---|
| 7,564,977 B2 * | 7/2009 | Marino | H04L 9/0827 380/277 |
| 7,929,703 B2 | 4/2011 | Bellows et al. | |
| 8,027,304 B2 | 9/2011 | Forsberg | |
| 8,078,753 B2 | 12/2011 | Bachmann et al. | |
| 8,094,817 B2 | 1/2012 | Blom et al. | |
| 8,107,433 B2 | 1/2012 | Jokinen | |
| 8,117,454 B2 | 2/2012 | Forsberg | |
| 8,165,054 B2 | 4/2012 | Becker et al. | |
| 8,170,566 B2 | 5/2012 | Pudney | |
| 8,213,903 B2 | 7/2012 | Pudney et al. | |
| 8,462,742 B2 | 6/2013 | Song et al. | |
| 8,515,462 B2 | 8/2013 | Courau et al. | |
| 8,533,455 B2 | 9/2013 | Haddad et al. | |
| 8,582,766 B2 | 11/2013 | Yan | |
| 8,599,797 B2 | 12/2013 | Pelkonen | |
| 8,774,759 B2 | 7/2014 | He | |
| 8,917,698 B2 | 12/2014 | Lundin et al. | |
| 9,060,268 B2 | 6/2015 | He | |
| 2002/0052200 A1 | 5/2002 | Arkko et al. | |
| 2002/0066011 A1 * | 5/2002 | Vialen | H04L 63/123 713/150 |
| 2002/0071558 A1 | 6/2002 | Patel | |
| 2003/0139180 A1 | 7/2003 | McIntosh et al. | |
| 2003/0169725 A1 | 9/2003 | Ahmavaara et al. | |
| 2004/0053607 A1 * | 3/2004 | Ronneke | H04L 47/10 455/422.1 |
| 2005/0047597 A1 * | 3/2005 | Zheng | H04W 12/02 380/247 |
| 2005/0090259 A1 * | 4/2005 | Jain | H04L 29/06 455/439 |
| 2005/0272481 A1 * | 12/2005 | Kim | H04L 29/12273 455/574 |
| 2006/0073849 A1 * | 4/2006 | Kuriki | H04W 88/02 455/560 |
| 2006/0182280 A1 | 8/2006 | Laitinen et al. | |
| 2006/0276226 A1 * | 12/2006 | Jiang | H04W 8/183 455/558 |
| 2007/0086591 A1 | 4/2007 | Blom et al. | |
| 2007/0117575 A1 | 5/2007 | Courau et al. | |
| 2007/0186000 A1 | 8/2007 | Nikander et al. | |
| 2007/0210894 A1 | 9/2007 | Park et al. | |
| 2007/0218903 A1 | 9/2007 | Grech | |
| 2007/0224993 A1 | 9/2007 | Forsberg | |
| 2007/0249352 A1 * | 10/2007 | Song | H04L 63/08 455/436 |
| 2007/0254656 A1 * | 11/2007 | Dalsgaard | H04B 7/2681 455/435.1 |
| 2007/0291673 A1 * | 12/2007 | Demirhan | H04W 52/0216 370/311 |
| 2007/0297367 A1 | 12/2007 | Wang et al. | |
| 2008/0010677 A1 * | 1/2008 | Kashima | H04L 1/1642 726/12 |
| 2008/0014930 A1 * | 1/2008 | Jokinen | H04W 8/12 455/432.3 |
| 2008/0020745 A1 | 1/2008 | Bae et al. | |
| 2008/0025263 A1 | 1/2008 | Pelkonen | |
| 2008/0031159 A1 | 2/2008 | Jokinen | |
| 2008/0039086 A1 * | 2/2008 | Gallagher | H04W 8/04 455/435.1 |
| 2008/0039087 A1 * | 2/2008 | Gallagher | H04W 8/04 455/435.2 |
| 2008/0043669 A1 * | 2/2008 | Gallagher | H04W 92/02 370/329 |
| 2008/0095111 A1 * | 4/2008 | Kim | H04W 36/14 370/331 |
| 2008/0095362 A1 * | 4/2008 | Blom | H04L 9/321 380/45 |
| 2008/0101400 A1 | 5/2008 | Auterinen | |
| 2008/0102896 A1 | 5/2008 | Wang et al. | |
| 2008/0161039 A1 * | 7/2008 | Kim | H04B 1/005 455/553.1 |
| 2008/0184032 A1 | 7/2008 | Li et al. | |
| 2008/0188200 A1 | 8/2008 | Forsberg | |
| 2008/0207168 A1 | 8/2008 | Forsberg | |
| 2008/0299979 A1 * | 12/2008 | Ko | H04W 60/04 455/442 |
| 2008/0301434 A1 | 12/2008 | Haddad et al. | |
| 2009/0025060 A1 | 1/2009 | Mukherjee et al. | |
| 2009/0067628 A1 | 3/2009 | Pudney et al. | |
| 2009/0073933 A1 | 3/2009 | Madour et al. | |
| 2009/0221306 A1 | 9/2009 | Jacobsohn et al. | |
| 2009/0275309 A1 | 11/2009 | He | |
| 2010/0080171 A1 * | 4/2010 | Rune | H04J 11/0069 370/328 |
| 2010/0190500 A1 | 7/2010 | Choi et al. | |
| 2010/0235634 A1 | 9/2010 | Fischer | |
| 2011/0093919 A1 * | 4/2011 | Naslund | H04L 63/20 726/3 |
| 2011/0235505 A1 * | 9/2011 | Eswara | H04L 43/10 370/221 |
| 2012/0020347 A1 * | 1/2012 | De Vega De La Red | H04W 8/12 370/338 |
| 2014/0016614 A1 * | 1/2014 | Velev | H04W 4/005 370/331 |
| 2014/0169563 A1 | 6/2014 | Yan | |

FOREIGN PATENT DOCUMENTS

| | | |
|---|---|---|
| CN | 1710985 A | 12/2005 |
| CN | 1795656 A | 6/2006 |
| CN | 1801698 A | 7/2006 |
| CN | 1937487 A | 3/2007 |
| CN | 1953374 A | 4/2007 |
| CN | 1983921 A | 6/2007 |
| CN | 101005692 A | 7/2007 |
| EP | 1282321 B1 | 2/2005 |
| EP | 2214444 A1 | 8/2010 |
| JP | 2009531952 A | 9/2009 |
| JP | 2009540721 A | 11/2009 |
| JP | 2010521905 A | 6/2010 |
| JP | 2010528559 A | 8/2010 |
| WO | 03037021 A1 | 5/2003 |
| WO | 2007078159 A1 | 7/2007 |

OTHER PUBLICATIONS

3rd Generation Partnership Project; Technical Specification Group Services and System Aspects; GPRS enhancements for E-UTRAN

(56) References Cited

OTHER PUBLICATIONS access (Release 8); 3GPP Standard: 3GPP TS 23.401 V1.1.0, Jul. 2007.*
Huawei Techs. Co. v. T-Mobile US, Inc., Case No. 2:16-CV-00057-JRG-RSP. United States District Court for the Eastern District of Texas Marshall Division; Decided Jun. 21, 2017. 42 pages. (Year: 2017).*
Jung, SungHoon. Radio Protocols for LTE and LTE-Advanced, chapter 2. ISBN: 9781118188569, published by John Wiley & Sons. Sep. 2012. 3 pages. (Year: 2012).*
NSN268-1014,"About 3GPP",http://www.3gpp.org/about3gpp,Jan. 10, 2017,total 4 pages.
NSN268-1015,Dan Forsberg et al.,"LTE Security", Second Edition, Wiley, 2013,total 11 pages.
NSN268-1016,"Home", the Mobile Broadband Standard, Jan. 10, 2017,total 2 pages.
NSN268-1017,"Home",the Mobile Broadband Standard GPRS,Jan. 10, 2017,total 2 pages.
NSN268-1018,First Amended Complaint for Patent Infringement,Civil Action No. 2:16-cv-00057, Jan. 29, 2016,total 29 pages.
NSN268-1019,Joint Claim Construction and Prehearing Statement,Civil Action No. 2:16-cv-00057-JRG-RSP, Dec. 9, 2016,total 72 pages.
NSN268-1020,"3GPP FAQs",the Mobile Broadband Standard EDGE,Jan. 12, 2017,total 11 pages.
NSN268-1021,"Delegates Corner",the Mobile Broadband Standard EDGE+,Jan. 12, 2017,total 5 pages.
NSN268-1022,"The Evolved Packet Core",The Mobile Broadband Standard LTEAdvanced Pro,Jan. 11, 2017,total 3 pages.
NSN268-1023,Technical Specification Group Services and System Aspects TSGS#39(08)0132,"Updated WID: 3GPP System Architecture Evolution Specification (SAES) to include Security Building blocks based on SP-070933 after accepting revision marks.",SA WG3, Mar. 10-13, 2008,total 5 pages.
NSN268-1024,3GPP TR 25.931 V8.0.0,3rd Generation Partnership Project;Technical Specification Group Radio Access Network;UTRAN functions, examples on signalling procedures(Release 8),Dec. 2008,total 130 pages.
NSN268-1025,3GPP TS 24.301 V8.0.0,3rd Generation Partnership Project;Technical Specification Group Core Network and Terminals;Non-Access-Stratum (NAS) protocol for Evolved Packet System (EPS);Stage 3(Release 8), Dec. 2008,total 221 pages.
NSN268-1026,Declaration of David L. Lyon,total 14 pages.
NSN268-1050,3GPP TR 21.900 V6.0.0,3rd Generation Partnership Project;Technical Specification Group Services and System Aspects;Technical Specification Group working methods(Release 5),Sep. 2003,total 33 pages.
Exhibit B-1,TS 23.401 V1.1.1, GPRS Enhancements for E-UTRAN Access (dated Aug. 13, 2007) and TR 33.821 V0.4.0, Rationale and track of security decisions in Long Term Evolved (LTE) RAN / 3GPP System Architecture Evolution (from Jul. 2007),Aug. 11, 2016,total 27 pages.
Exhibit B-2,TS 23.060 V1.1.1, General Packet Radio Service (GPRS) Service Description (dated Mar. 20, 2007) and TR 33.821 V0.4.0,Rationale and track of security decisions in Long Term Evolved (LTE) RAN / 3GPP System Architecture Evolution (from Jul. 2007),Aug. 11, 2016,total 61 pages.
Exhibit B-3,U.S. Pat. No. 8,462,742 ("The '742 patent") and TR 33.821 V0.4.0, Rationale and track of security Decisions in Long Term Evolved (LTE) RAN / 3GPP System Architecture Evolution (from Jul. 2007),Aug. 11, 2016,total 29 pages.
Exhibit B-4,Heikki Kaaranen et al., UMTS Networks: Architecture, Mobility and Services, 2nd Ed. (John Wiley & Sons Ltd.) (2006)("UMTS Networks") and TR 33.821 V0.4.0, Rationale and track of security decisions in Long Term Evolved (LTE) RAN / 3GPP System Architecture Evolution (from Jul. 2007) ("TR 33.821 V0.4.0"),Aug. 11, 2016,total 35 pages.
Exhibit B-5,TS 23.401 V1.1.1, GPRS Enhancements for E-UTRAN Access (dated Aug. 13, 2007), TS 23.060 V1.1.1, General Packet Radio Service (GPRS) Service Description (dated Mar. 20, 2007), and TR 33.821 V0.4.0, Rationale and track of security decisions in Long Term Evolved (LTE) RAN / 3GPP System Architecture Evolution (from Jul. 2007),Aug. 11, 2016,total 72 pages.
R. Rajavelsamy et al.,"Security Aspects of Inter-Access System Mobility Between 3GPP and Non-3GPP Networks (Invited Paper)",Communication Systems Software and Middieware and Workshop,2008,total 5 pages.
Decision Institution of Inter Partes Review 37 C.F.R. § 42.108, Case IPR2017-00661,U.S. Pat. No. 9,060,268 B2, dated Jul. 28, 2017. total 35 pages.
Case Management and Scheduling Order 37 C.F.R. § 42.5, Case IPR2017-00661,U.S. Pat. No. 9,060,268 B2, dated Jul. 28, 2017. total 10 pages.
"3GPP TS 29.060 V7.7.0 (Sep. 2007), 3rd Generation Partnership Project;Technical Specification Group Core Network and Terminals;General Packet Radio Service (GPRS); GPRS Tunnelling Protocol (GTP)across the Gn and Gp Interface(Release 7), 143 pages".
3GPP TSG SA WG3 Security—SA3#46b s3-070232,"Pseudo-Change Request to TR 33.821: Update of sections 7.4.11 and 7.4.12 on active and idle mode mobility of user-related keys in SAE/LTE",Nokia, Siemens Networks, Mar. 28-29, 2007,total 6 pages.
3GPP TR 88.821 V0.4.0, 3rd Generation Partnership Project;Technical Specification Group Services and System Aspects;Rationale and track of security decisions in Long Term Evolved(LTE) RAN/ 3GP System Architecture Evolution(SAE)(Release 8), Jul. 2007,total 94 pages.
3GPP TS 23.060 V7.4.0,3rd Generation Partnership Project;Technical Specification Group Services and System Aspects;General Packet Radio Service (GPRS);Service description;Stage 2(Release 7),Mar. 2007,total 216 pages.
3GPP TS 23.401 V1.1.0,3rd Generation Partnership Project;Technical Specification Group Services and System Aspects;GPRS enhancements for E-UTRAN access(Release 8),Jul. 2007,total 78 pages.
ETSI TS 143 020 V7.0.0,Digital cellular telecommunications system (Phase 2+);Security-related network functions (3GPP TS 43.020 version 7.0.0 Release 7),Jun. 2007,total 112 pages.
3GPP TSG SA WG3 Security—S3#48 S3-070529,"Pseudo-CR to TR 33.821: Key handling on idle mode mobility", Nokia Siemens Networks, Nokia,Jul. 10-13, 2007,total 3 pages.
3GPP TSG SA WG3 Security—SA3#47 S3-070304,"Key handling on idle mode mobility",Nokia Siemens Networks, Nokia,May 22-25, 2007,total 2 pages.
3GPP TSG SA WG2 Architecture—S2#58 52-073103(e-mail revision 1 of S2-072967),"Tracking Area Update UMTS—E-UTRAN",Ericsson,Jun. 25-29, 2007,total 7 pages.
3GPP TSG SA WG2 Architecture—S2#58 52-073102(e-mail revision 5 of S2-072966),"Tracking Area Update GERAN—E-UTRAN",Ericsson,Jun. 25-29, 2007,total 6 pages.
3GPP TSG SA WG2 Architecture—S2#58 S2-072967,"Tracking Area Update UMTS—E-UTRAN",Ericsson,Jun. 25-29, 2007,total 7 pages.
3GPP TSG SA WG2 Architecture—S2#58 S2-072966,"Tracking Area Update GERAN—E-UTRAN",Ericsson,Jun. 25-29, 2007,total 6 pages.
3GPP TS 24.008 V7.8.0,3rd Generation Partnership Project;Technical Specification Group Core Network and Terminals;Mobile radio interface Layer 3 specification;Core network protocols; Stage 3(Release 7),Jun. 2007,total 547 pages.
3GPP TSG SA WG3 Security—S3#49 S3-070685,"Key handling on idle mode mobility from UTRAN to E-UTRAN", Huawei, Oct. 8-12, 2007,total 2 pages.
3GPP TS 23.401 V1.1.0,3rd Generation Partnership Project;Technical Specification Group Services and System Aspects;GPRS enhancements for E-UTRAN access(Release 8),Jul. 2007,total 102 pages.
3GPP TS 23.401 V1.1.0,3rd Generation Partnership Project;Technical Specification Group Services and System Aspects;GPRS enhancements for E-UTRAN access(Release 8),Jul. 2007,total 83 pages.
3GPP TS 29.060 V8.0.0,3rd Generation Partnership Project;Technical Specification Group Core Network and Terminals;General Packet Radio Service (GPRS);GPRS Tunnelling Protocol (GTP) across the Gn and Gp interface (Release 8),Jun. 2007,total 150 pages.

(56) References Cited

OTHER PUBLICATIONS

3GPP TS 33.102 V7.1.0,3rd Generation Partnership Project;Technical Specification Group Services and System Aspects;3G Security;Security architecture(Release 7),Dec. 2006,total 70 pages.
3GPP TSG SA WG2 Architecture—S2#56c Rel-8 Ad-hoc S2-071124,"Attach signalling flows",Huawei, Mar. 26-30, 2007,total 5 pages.
3GPP TSG SA WG2 Architecture—S2 Rel-8 Ad-hoc S2-071399,"Tracking Area Update with CN Node Change", Nokia, Siemens Networks, Mar. 26-30, 2007,total 7 pages.
3GPP TR 33.821 V0.4.0,3rd Generation Partnership Project;Technical Specification Group Services and System Aspects;Rationale and track of security decisions in Long Term Evolved (LTE) RAN / 3GPP System Architecture Evolution(SAE) (Release 8), Jul. 2007,total 95 pages.
TSG-RAN Working Group 3 meeting #7 TSGR3#7(99)D49,"Proposed liaison statement to SA3,CN1,RAN2",Ericsson, Sep. 20-24, 1999,total 9 pages.
3GPP TS 23.401 V132.0,3rd Generation Partnership Project;Technical Specification Group Services and System Aspects;GPRS enhancements for E-UTRAN access(Release 13) ,Mar. 2015,total 331 pages.
Patrick Horster,"Communications and Multimedia Security 2",Springer International Publishing, Cham, Sep. 23-24, 1996,total 19 pages.
Steve Burnett et al.,"RSA Security's Official Guide to Cryptography",Osbome/McGraw-Hill, 2001,total 44 pages.
Warwick Ford et al.,"Secure Electronic Commerce-Building the Infrastructure for Digital Signatures and Encryption", Second Edition, Prentice Hall PTR, 2000,total 19 pages.
Heikki Kaaranen et al.,"UMTS Networks—Architecture, Mobility and Services",Second Edition, John Wiley&Sons;Ltd, 2005,total 413 pages.
Valtteri Niemi et al.,"UMTS Security", John Wiley & Sons, Ltd, 2003,total 57 pages.
3GPP TS 25.304 V3.14.0,3rd Generation Partnership Project;Technical Specification Group Radio Access Network; User Equipment (UE) procedures in idle mode and procedures for cell reselection in connected mode (Release 1999), Mar. 2004,total 41 pages.
3GPP TR 23.882 V1.11.0,3rd Generation Partnership Project;Technical Specification Group Services and System Aspects;3GPP System Architecture Evolution:Report on Technical Options and Conclusions(Release 7),Jul. 2007, total 211 pages.
Rajavelsamy R* et al.,"A Novel Method for Authentication Optimization during Handover in Heterogeneous Wireless Networks", 2007 IEEE,total 5 pages.
A.R. Prasad et al.,"An Evolutionary Approach rowards Ubiquitous Communications: A Security Perspective", Computer Society, 2014,total 7 pages.
Victor Y.H. Kueh et al.,"Application of Context Transfer for Roaming in IP-Based Evolved 3G NETWOR", The 17th Annual IEEE International Symposium on Personal, Indoor and Mobile Radio Communication,2006,total 5 pages.

Shan Yeob Yeum et al.,"Security for Emerging Ubiquitous Networks",2005 IEEE,total 7 pages.
S.Sargento et al.,"Ubiquitous Access through the Integration of Mobile Ad-hoc Networks",total 6 pages.
3GPP TS 24.008 V7.9.0,3rd Generation Partnership Project;Technical Specification Group Core Network and Terminals; Mobile radio interface Layer 3 specification:Core network protocols; Stage 3(Release 7),Sep. 2007, total 549 pages.
3GPP TS 33.102 V7.1.0,3rd Generation Partnership Project;Technical Specification Group Services and System Aspects;3G Security;Security architecture(Release 7),Dec. 2006,total 64 pages.
In the United States District Court for the Eastern District of Texas Marshall Division, Huawei Technologies Co. Ltd., v. T-Mobile US, Inc. and T-Mobile USA, Inc.,Civil Action No. 2:16-cv-0057-JRG-RSP,Jan. 20, 2017,total 37 pages.
In the United States District Court for the Eastern District of Texas Marshall Division, Huawei Technologies Co. Ltd.,v. T-Mobile US, Inc. and T-Mobile USA, Inc.,Civil Action No. 2:16-cv-0057-JRG-RSP,Feb. 17, 2017,total 14 pages.
Patent Owner's Preliminary Response,Case No. IPR2017-00661,U.S. Pat. No. 9,060,268, dated Jan. 5,2017, total 80 pages.
United States District Court Eastern District of Texas Marshall Division,Civil Action No. 2:16-cv-00057-JRG-RSP,Aug. 11, 2016,total 224 pages.
Petition for Inter Partes Review,Case: IPR2017-00661,U.S. Pat. No. 9,060,268,dated Jan. 19, 2017,total 88 pages.
NSN268-1002 File History of U.S. Pat. No. 9,060,268,total 1012 pages.
NSN268-1003 Petitioner's Exhibit NSN268-1003,Declaration of David Lyon,Case: IPR2017-00661, Jan. 19, 2017,total 211 pages.
NSN268-1004 Petitioners' Exhibit NSN268-1004 Declaration of Balazs Bertenyi,Case: IPR2017-00661,Jan. 10, 2017,total 21 pages.
NSN268-1006 3GPP TR 33.821 V0.4.0,3rd Generation Partnership Project;Technical Specification Group Services and System Aspects; Rationale and track of security decisions in Long TermEvolved (LTE) RAN / 3GPP System Architecture Evolution(SAE)(Release 8),Jul. 2007,total 88 pages.
NSN268-1009 3GPP TS 23.401 V8.4.0,3rd Generation Partnership Project;Technical Specification Group Services and System Aspects;General Packet Radio Service (GPRS) enhancements forEvolved Universal Terrestrial Radio Access Network(E-UTRAN) access(Release 8),Dec. 2008,total 219 pages.
NSN268-1010 3GPP TR 21.905 V7.0.0,3rd Generation Partnership Project;Technical Specification Group Services and System Aspects;Vocabulary for 3GPP Specifications(Release 7),Sep. 2005,total 55 pages.
NSN268-1012,3GPP TS 33.401 V2.0.0,3rd Generation Partnership Project;Technical Specification Group Services and System Aspects;3GPP System Architecture Evolution (SAE):Security Architecture;(Release 8),May 2008,total 45 pages.
NSN268-1013,Technical Specification Group Services and System Aspects TSGS#34(06)060926,"Updated WID: 3GPP System Architecture Evolution Specification(SAES)",Motorola et al.,Dec. 4-7, 2006,total 4 pages.

* cited by examiner

METHOD, SYSTEM AND APPARATUS FOR NEGOTIATING SECURITY CAPABILITIES DURING MOVEMENT OF UE

CROSS-REFERENCE TO RELATED APPLICATIONS

This application is a continuation of U.S. patent application Ser. No. 14/728,687, filed on Jun. 2, 2015, which is a continuation of U.S. patent application Ser. No. 12/717,385, filed on Mar. 4, 2010, which is a continuation of International Application No. PCT/CN2008/072486, filed on Sep. 24, 2008. The International Application claims priority to Chinese Patent Application No. 200710181068.4, filed on Sep. 29, 2007. The afore-mentioned patent applications are hereby incorporated by reference in their entireties.

FIELD OF THE INVENTION

The present invention relates to communication technologies, and in particular, to a method, system, and apparatus for negotiating security capabilities during movement of a User Equipment (UE).

BACKGROUND OF THE INVENTION

A radio network includes two parts: radio access network and core network. A Long Term Evolution (LTE) radio core network includes a Mobility Management Entity (MME), which implements mobility management and user authentication like a Serving GPRS Support Node (SGSN) in a 2G/3G network. When the UE is idle in the 2G/3G network or the LTE network, the UE needs to negotiate Non-Access Signaling (NAS) security capabilities with the SGSN or MME to ensure normal receiving of the signaling and the security of the communication system.

When the UE in an idle state that accesses the network through an LTE radio access network, the UE may move to a routing area of a 2G GSM Edge Radio Access Network (GERAN) or a 3G UMTS Terrestrial Radio Access Network (UTRAN), and may access the access network through the 2G/3G network again. In this case, Routing Area Update (RAU) between Radio Access Technologies (inter-RAT) occurs; that is, an RAU process between heterogeneous networks occurs. In this process, the entity for negotiating security capabilities for the UE changes, for example, from an MME to an SGSN. The security capabilities of such entities are not necessarily the same. Therefore, it is necessary to perform the security capability negotiation process again to ensure security in the interaction between the UE and the network in the subsequent process.

When the UE moves from an LTE network to a UTRAN network, the RAU process involves negotiation of the ciphering algorithm and the integrity protection algorithm between the UE and the Radio Network Controller (RNC), and negotiation of the ciphering key and the integrity protection key.

When the UE moves from an LTE network to a GERAN network, the RAU process involves negotiation of the ciphering algorithm and the ciphering key between the UE and the 2G SGSN.

The prior art provides no method for negotiating security capabilities in the RAU process between heterogeneous networks. Therefore, when the UE moves from an LTE network to a 2G/3G network, the security capability negotiation is not supported, and the security is not ensured in the subsequent interaction between the UE and the network.

SUMMARY OF THE INVENTION

The embodiments of the present invention provide a method for negotiating security capabilities during movement of a UE, so that the security capabilities can be negotiated when the UE in the idle state moves from an LTE network to a 2G/3G network.

The embodiments of the present invention provide a system for negotiating security capabilities during movement of a UE, so that the security capabilities can be negotiated when the UE in the idle state moves from an LTE network to a 2G/3G network.

The embodiments of the present invention provide an SGSN which obtains Authentication Vector (AV)-related keys when an UE in the idle state moves from an LTE network to a 2G/3G network.

The embodiments of the present invention provide an MME which sends AV-related keys to the 2G/3G network when an UE in the idle state moves from an LTE network to a 2G/3G network.

The technical solution of the present invention is implemented in the following way:

A method for negotiating security capabilities during movement of a UE is provided. When the UE moves from an LTE source network to a 2G/3G target network, the method includes:

by a target network entity, receiving an RAU Request message sent by the UE, obtaining the security capabilities supported by the UE, and obtaining AV-related keys deduced according to a root key;

selecting a security algorithm according to the security capabilities supported by the UE and sending the selected security algorithm to the UE; and deducing, by the UE, the AV-related keys according to the root key of the UE.

With reference to the above method, the obtaining Authentication Vector (AV)-related keys deduced according to a root key comprises:

a Serving GPRS Support Node (SGSN) that serves as the target network entity obtains the root key in a mobility management context response received from a Mobility Management Entity (MME) and deduces the AV-related keys according to the obtained root key; or the SGSN that serves as the target network entity obtains the AV-related keys in the mobility management context response received from the MME, wherein the AV-related keys are deduced by the MME according to the root key of the MME.

With reference to the above method, if the target network is a 2G network, the AV-related keys comprise at least a Ciphering Key (Kc) or a value derived from the Kc through unidirectional transformation; and if the target network is a 3G network, the AV-related keys comprise at least an Integrity Protection Key (IK) and a Ciphering Key (CK), or comprise at least values derived from the IK and the CK through unidirectional transformation.

With reference to the above method, the obtaining security capabilities supported by the UE comprises:

a Serving GPRS Support Node that serves as the target network entity, obtains the security capabilities supported by the UE from the RAU request sent by the UE; or the SGSN that serves as the target network entity obtains the security capabilities supported by the UE from a mobility management context response received from a Mobility Management Entity.

With reference to the above system, the target network entity is a Serving GPRS Support Node (SGSN) in a 3G network, and the SGSN comprises:

a key obtaining module adapted to obtain the root key in a mobility management context response from a Mobility Management Entity (MME) after receiving the RAU Request message sent by the UE, and deduce the AV-related keys according to the root key; or adapted to obtain the AV-related keys in the mobility management context response from the MME, wherein the AV-related keys are deduced by the MME according to the root key of the MME.

With reference to the above system, further comprising the MME, which is applicable when the UE moves from the LTE source network to the 2G/3G target network, wherein:

if the key obtaining module is adapted to obtain the root key from the mobility management context response received from the MME, the MME comprises: a storing module adapted to store the root key; and a first sending module adapted to send the root key stored in the storing module to the SGSN through the mobility management context response after receiving a mobility management context request sent by the SGSN;

if the key obtaining module is adapted to obtain the AV-related keys from the mobility management context response received from the MME, wherein the AV-related keys are deduced by the MME according to the root key of the MME, the MME comprises: a key deducing module adapted to deduce the AV-related keys according to the root key after receiving the mobility management context request sent by the SGSN; and a second sending module adapted to send the AV-related keys obtained by the key deducing module to the SGSN through the mobility management context response.

A system for negotiating security capabilities during movement of a UE is provided. The system includes a UE and a target network entity.

The UE is adapted to: send an RAU Request message to the target network entity when the UE moves from an LTE source network to a 2G/3G target network, receive a selected security algorithm sent by the target network entity, and deduce AV-related keys according to a root key of the UE.

The target network entity is adapted to: receive the RAU Request message sent by the UE, obtain the security capabilities supported by the UE and the AV-related keys deduced according to the root key, select a security algorithm according to the security capabilities supported by the UE, and send the selected security algorithm to the UE.

With reference to the above system, the target network entity is a Serving GPRS Support Node (SGSN) in a 2G network, and the SGSN comprises:

a key obtaining module adapted to obtain the root key in a mobility management context response from a Mobility Management Entity (MME) after receiving the RAU Request message sent by the UE, and deduce the AV-related keys according to the root key; or, obtain the AV-related keys in the mobility management context response from the MME, wherein the AV-related keys are deduced by the MME according to the root key of the MME; and a selecting and sending module adapted to obtain the security capabilities supported by the UE, select a security algorithm according to the security capabilities supported by the UE, and send the selected security algorithm to the UE.

An SGSN is provided, which is applicable when a UE moves from an LTE source network to a 2G/3G target network. The SGSN includes a key obtaining module.

The key obtaining module is adapted to: obtain a root key in a mobility management context response received from an MME and deduce AV-related keys according to the root key; or obtain the AV-related keys in the mobility management context response from the MME, where the AV-related keys are deduced by the MME according to the root key of the MME.

An MME is provided, which is applicable when a UE moves from an LTE source network to a 2G/3G target network. The MME includes a key deducing module and a sending module.

The key deducing module is adapted to deduce AV-related keys according to a root key after receiving a mobility management context request sent by an SGSN.

The sending module is adapted to send the AV-related keys obtained by the key deducing module to the SGSN through a mobility management context response.

Compared with the prior art, the technical solution of the present invention brings the following benefits: When the UE moves from an LTE source network to a 2G/3G target network, the target network entity receives the RAU Request sent by the UE, and obtains the security capabilities supported by the UE and the AV-related keys deduced according to the root key; the UE deduces the AV-related keys according to the root key of the UE, thus implementing key negotiation of the security capability negotiation; the target network entity selects a security algorithm according to the security capabilities supported by the UE, and sends the selected security algorithm to the UE, thus implementing security algorithm negotiation of the security capability negotiation. Therefore, when the UE moves from an LTE source network to a 2G/3G target network, the UE can negotiate security capabilities with the network, thus ensuring security in the subsequent interaction between the UE and the network.

DETAILED DESCRIPTION OF THE EMBODIMENTS

The present invention is detailed below with reference to accompanying drawings and exemplary embodiments.

In the method for negotiating security capabilities during movement of a UE, when the UE moves from an LTE source network to a 2G/3G target network, the target network entity receives the RAU Request sent by the UE, and obtains the security capabilities supported by the UE and the AV-related keys deduced according to the root key; a security algorithm is selected according to the security capabilities supported by the UE, and the selected security algorithm is sent to the UE; the UE deduces the AV-related keys according to the root key of the UE.

The first, second, and third embodiments give details of the process of negotiating security capabilities when the UE moves from an LTE network to a 3G network. After the UE in the idle state accesses the LTE network, the UE moves from the LTE source network to the 3G target network, which triggers a process of negotiating security capabilities. The target network entities are a 3G SGSN and an RNC.

First Embodiment

In this embodiment, the 3G SGSN obtains the AV-related keys from the MME directly, where the AV-related keys are deduced according to the root key.

Figure 1:
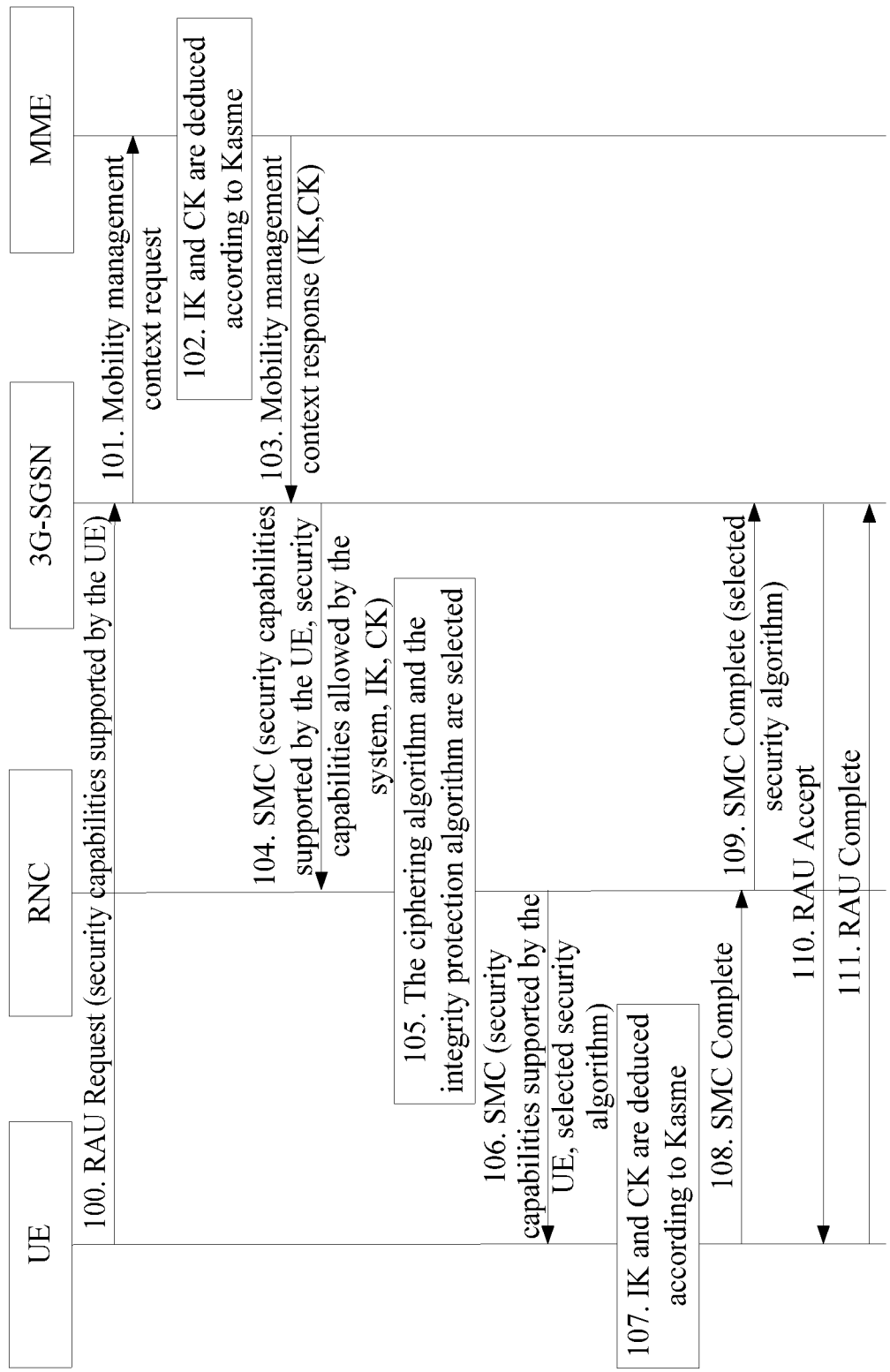
FIG. 1 is a flowchart of a method for negotiating security capabilities during movement of a UE according to a first embodiment of the present invention.

FIG. 1 is a flowchart of a method for negotiating security capabilities during movement of a UE according to the first embodiment of the present invention. As shown in FIG. 1, the method includes the following steps:

Step 100: The UE sends an RAU Request to the 3G SGSN through an RNC.

The RAU Request sent by the UE to the 3G SGSN in this step not only carries the parameters well known to those skilled in the art, for example, Temporary Mobile Subscriber Identifier (TMSI), but also may carries the security capabilities supported by the UE, for example, a ciphering algorithm and/or an integrity protection algorithm.

Steps 101-103: The 3G SGSN obtains the AV-related keys from the MME through a mobility management context message, where the AV-related keys are deduced according to the root key.

Specifically, the 3G SGSN sends a mobility management context request to the MME. The MME deduces the AV-related keys through a unidirectional transformation function according to its own root key Kasme, where the AV-related keys include an integrity protection key IK and a ciphering key CK, or an IK' and a CK' further derived from the IK and the CK through unidirectional transformation by the MME; then the MME returns a mobility management context response that carries the AV-related keys to the 3G SGSN; and the 3G SGSN uses the AV-related keys as the current ciphering key and integrity protection key.

In step 100, if the RAU Request sent by the UE to the 3G SGSN carries no security capabilities supported by the UE, the mobility management context response returned by the MME to the 3G SGSN in step 103 needs to further carry the security capabilities supported by the UE.

A unidirectional transformation process transforms a source parameter to a target parameter through an algorithm, but cannot transform the target parameter back to the source parameter. For example, a CK is obtained through the algorithm f(Kasme), but it is not possible to deduce the Kasme from the CK through any inverse algorithm, which is known as unidirectional transformation.

Steps 104-106: The 3G SGSN sends a Security Mode Command (SMC) message to the RNC. The message carries the security capabilities supported by the UE, security capabilities allowed by the system, and a security key. According to the security capabilities supported by the UE, the security capabilities allowed by the system, and the security capabilities supported by the RNC, the RNC selects security algorithms, including a ciphering algorithm and an integrity protection algorithm, and then sends an SMC message that carries the security capabilities supported by the UE and the selected security algorithm to the UE.

The SMC message may also be carried in the RAU Accept message.

Steps 107-109: The UE deduces the AV-related keys according to its own root key, where the AV-related keys include IK and CK, or an IK' and a CK' further derived from the IK and the CK through unidirectional transformation, and uses them as the current ciphering key and integrity protection key respectively. According to the security capabilities supported by the UE from the RNC and the security capabilities stored in the UE, the UE judges whether any bidding down attack exists, and then sends an SMC Complete message to the RNC. The RNC sends an SMC Complete message that carries the selected security algorithm to the 3G SGSN.

The SMC Complete message may also be carried in an RAU Complete message.

Steps 110-111: The 3G SGSN sends an RAU Accept message to the UE. After receiving the message, the UE returns an RAU Complete message to the 3G SGSN.

Second Embodiment

In this embodiment, the 3G SGSN obtains a root key from the MME, and then deduces AV-related keys according to the root key.

Figure 2:
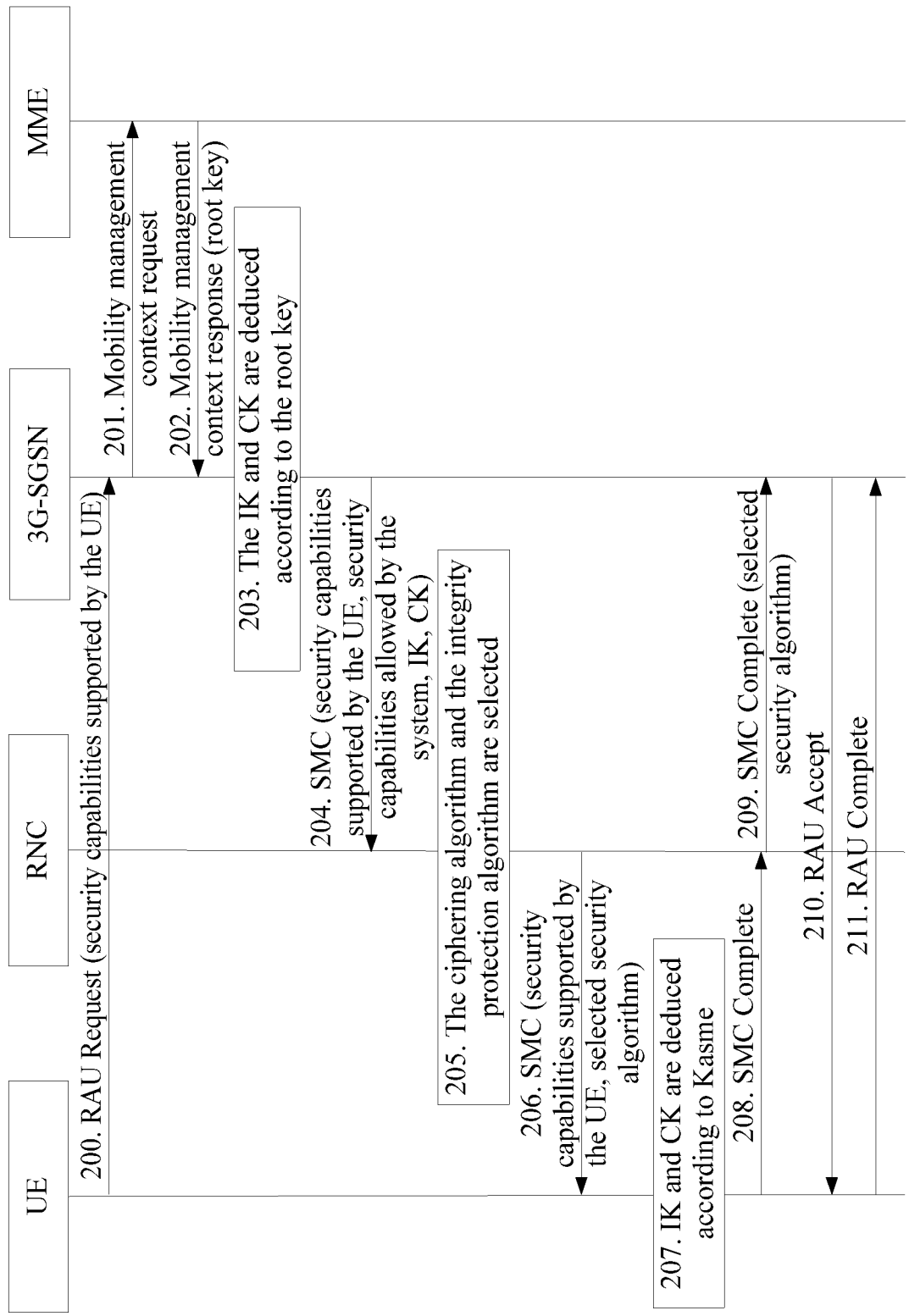
FIG. 2 is a flowchart of a method for negotiating security capabilities during movement of a UE according to a second embodiment of the present invention.

FIG. 2 is a flowchart of a method for negotiating security capabilities during movement of a UE according to the first embodiment of the present invention. As shown in FIG. 2, the method includes the following steps:

Step 200: The UE sends an RAU Request to the 3G SGSN through an RNC.

The RAU Request sent by the UE to the 3G SGSN in this step not only carries the parameters well known to those skilled in the art, for example, TMSI, but also may carries the security capabilities supported by the UE, for example, a ciphering algorithm and/or an integrity protection algorithm.

Steps 201-203: The 3G SGSN obtains the root key from the MME through a mobility management context message, and then deduces the AV-related keys according to the root key.

Specifically, the 3G SGSN sends a mobility management context request to the MME. The MME returns a mobility management context response that carries the root key to the 3G SGSN. The 3G SGSN deduces the AV-related keys through a unidirectional transformation function according to the root key Kasme in the response, where the AV-related keys include an integrity protection key IK and a ciphering key CK, or an IK' and a CK' further derived from the IK and the CK through unidirectional transformation by the 3G SGSN, and uses them as the current ciphering key and integrity protection key respectively.

In step 200, if the RAU request sent by the UE to the 3G SGSN carries no security capabilities supported by the UE, the mobility management context response returned by the MME to the 3G SGSN in step 103 needs to further carry the security capabilities supported by the UE.

Steps 204-206: The 3G SGSN sends an SMC message to the RNC. The message carries the security capabilities supported by the UE, security capabilities allowed by the system, and a security key. According to the security capabilities supported by the UE, the security capabilities allowed by the system, and the security capabilities supported by the RNC, the RNC selects security algorithms, including a ciphering algorithm and an integrity protection algorithm, and then sends an SMC message that carries the security capabilities supported by the UE and the selected security algorithm to the UE.

The SMC message may also be carried in the RAU Accept message.

Steps 207-209: The UE deduces the AV-related keys (including IK and CK) according to its own root key, where the AV-related keys include IK and CK, or an IK' and a CK' further derived from the IK and the CK through unidirectional transformation, and uses them as the current ciphering key and integrity protection key respectively. According to the security capabilities supported by the UE from the RNC and the security capabilities stored in the UE, the UE judges whether any bidding down attack exists, and then sends an SMC Complete message to the RNC. The RNC sends an SMC Complete message that carries the selected security algorithm to the 3G SGSN.

The SMC Complete message may also be carried in an RAU Complete message.

Steps 210-211: The 3G SGSN sends an RAU Accept message to the UE. After receiving the message, the UE returns an RAU Complete message to the 3G SGSN.

Third Embodiment

In this embodiment, the UE of the 3G SGSN obtains the AV-related keys through an Authentication and Key Agreement (AKA) process.

Figure 3:
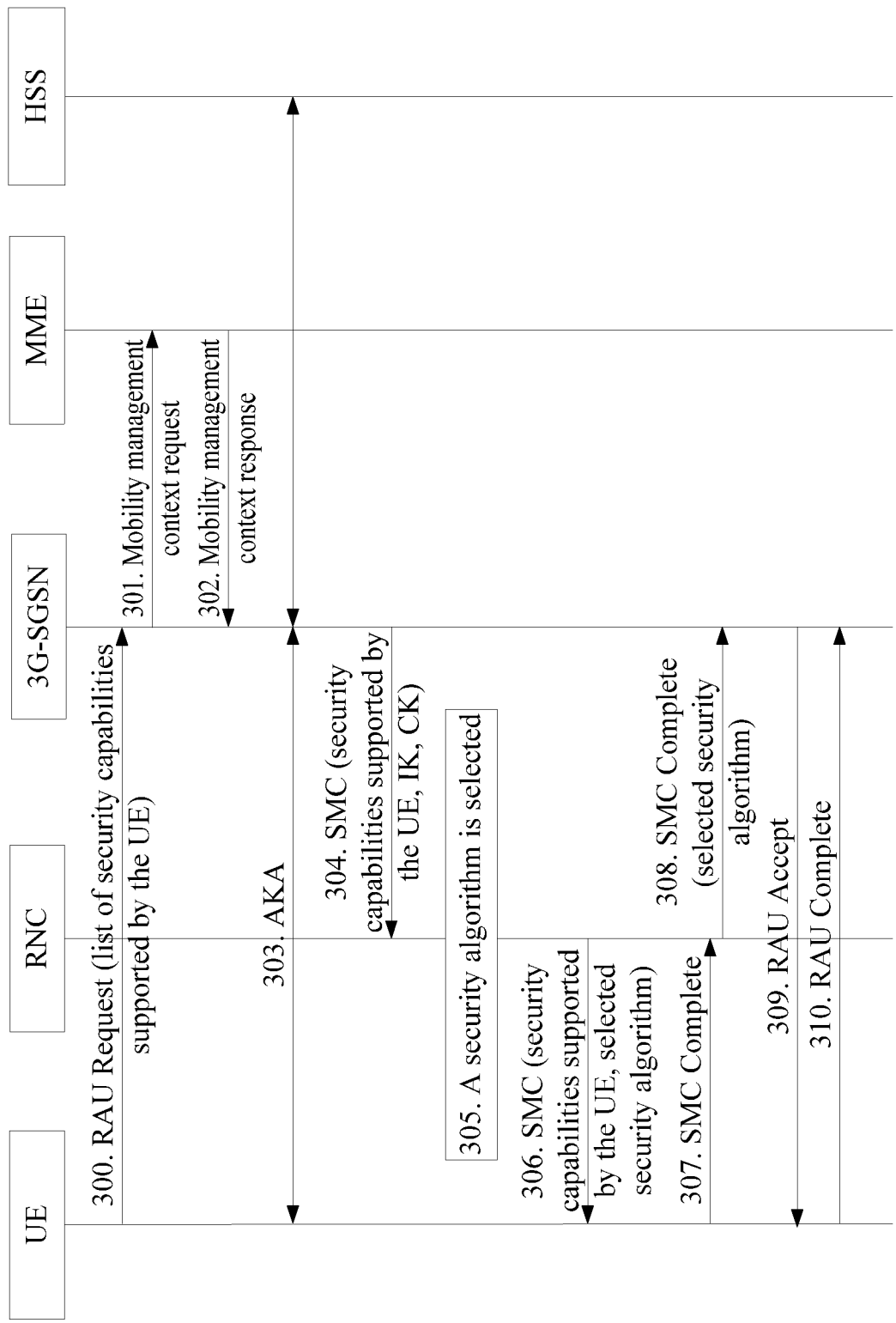
FIG. 3 is a flowchart of a method for negotiating security capabilities during movement of a UE according to a third embodiment of the present invention.

FIG. 3 is a flowchart of a method for negotiating security capabilities during movement of a UE according to the third embodiment of the present invention. As shown in FIG. 3, the method includes the following steps:

Step 300: The UE sends an RAU Request to the 3G SGSN through an RNC.

Steps 301-302: The 3G SGSN obtains the mobility management context from the MME through a mobility management context message.

In step 300, if the RAU Request sent by the UE to the 3G SGSN carries no security capabilities supported by the UE, the mobility management context response returned by the MME to the 3G SGSN in step 302 needs to further carry the security capabilities supported by the UE.

Step 303: Through an AKA process, the 3G SGSN and the UE obtain the AV-related keys (IK and CK) from a Home Subscriber Server (HSS).

Steps 304-306: The 3G SGSN sends an SMC message to the RNC. The message carries the security capabilities supported by the UE, security capabilities allowed by the system, and a security key. According to the security capabilities supported by the UE, the security capabilities allowed by the system, and the security capabilities supported by the RNC, the RNC selects security algorithms, including a ciphering algorithm and an integrity protection algorithm, and then sends an SMC message that carries the security capabilities supported by the UE and the selected security algorithm to the UE.

The SMC message may also be carried in the RAU Accept message.

Steps 307-310 are the same as steps 108-111, and thus are not repeatedly described.

The fourth, fifth, and sixth embodiments give details of the process of negotiating security capabilities when the UE moves from an LTE network to a 2G network. After the UE in the idle state accesses the LTE network, the UE moves from the LTE source network to the 2G target network, which triggers a process of negotiating security capabilities. The target network entity is a 2G SGSN.

Fourth Embodiment

In this embodiment, the 2G SGSN obtains the AV-related keys from the MME directly, where the AV-related keys are deduced according to the root key.

Figure 4:
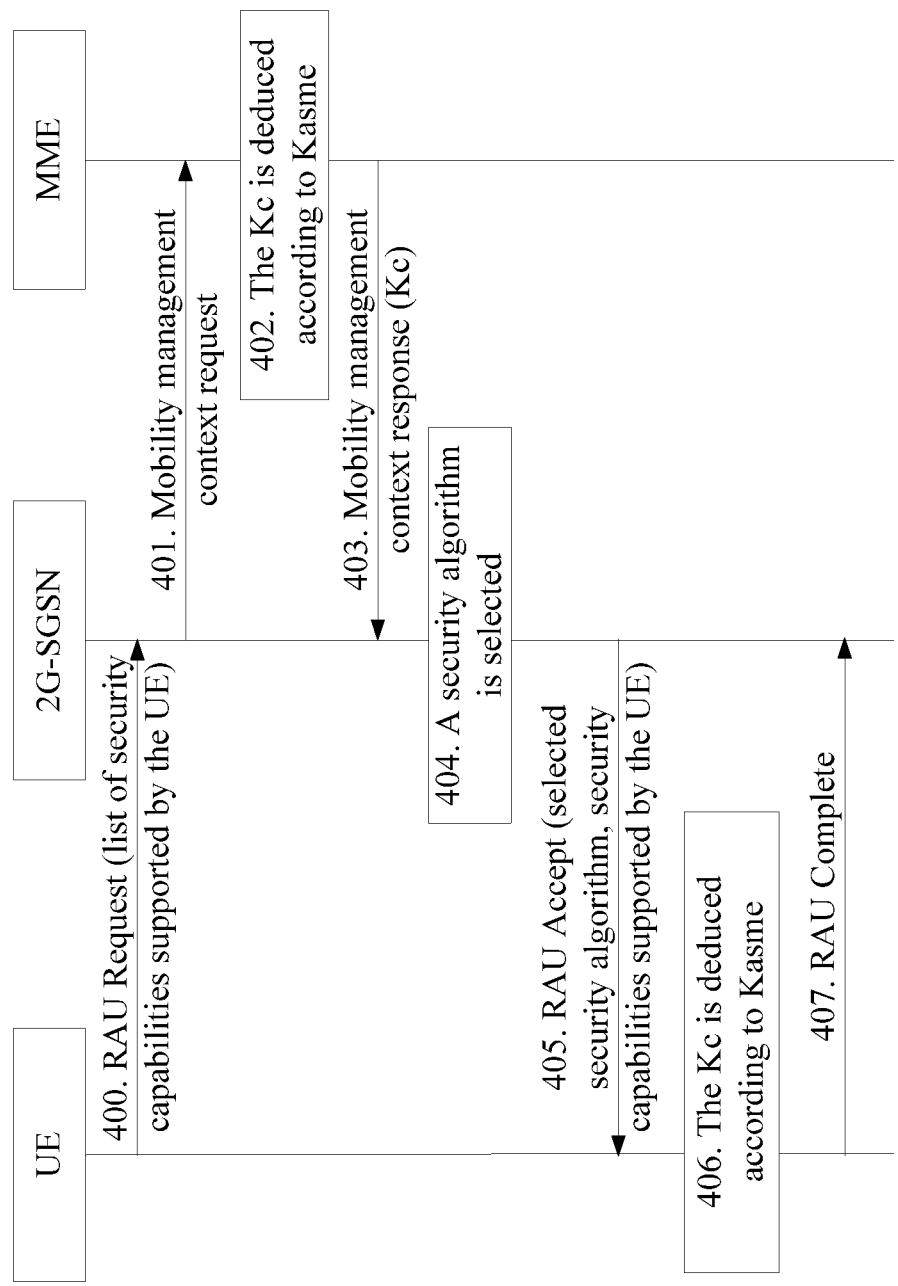
FIG. 4 is a flowchart of a method for negotiating security capabilities during movement of a UE according to a fourth embodiment of the present invention.

FIG. 4 is a flowchart of a method for negotiating security capabilities during movement of a UE according to the fourth embodiment of the present invention. As shown in FIG. 4, the method includes the following steps:

Step 400: The UE sends an RAU Request to the 2G SGSN.

The RAU Request sent by the UE to the 2G SGSN in this step not only carries the parameters well known to those skilled in the art, for example, TMSI, but also may carries the security capabilities supported by the UE, for example, a ciphering algorithm and/or an integrity protection algorithm.

In this step, the UE sends an RAU Request to the 2G SGSN through a Base Station System (BSS). For ease of description below, the communication performed between the UE and the 2G SGSN through a BSS is described briefly as the communication between the UE and the 2G SGSN.

Steps 401-403: The 2G SGSN obtains the AV-related keys from the mobility management context response received from the MME, where the AV-related keys are deduced according to the root key.

Specifically, the 2G SGSN sends a mobility management context request to the MME. The MME deduces the AV-related keys through a unidirectional transformation function according to its own root key Kasme. The AV-related keys include a ciphering key Kc, or Kc' further derived from the Kc through unidirectional transformation by the MME; then the MME returns a mobility management context response that carries the AV-related keys to the 2G SGSN; and the 2G SGSN uses the AV-related keys as the current ciphering key.

In step 400, if the RAU Request sent by the UE to the 2G SGSN carries no security capabilities supported by the UE, the mobility management context response returned by the MME to the 2G SGSN in step 403 needs to further carry the security capabilities supported by the UE.

Steps 404-405: The 2G SGSN selects security algorithms (including a ciphering algorithm) according to the security capabilities supported by the UE, the security capabilities allowed by the system, and the security capabilities supported by the 2G SGSN, and then sends an RAU Accept message to the UE, where the message carries the security capabilities supported by the UE and the selected security algorithm.

Steps 406-407: The UE deduces the AV-related keys according to its own root key, The AV-related keys include a Kc, or a Kc' further derived from the Kc through unidirectional transformation, and uses the AV-related keys as the current ciphering key. According to the security capabilities supported by the UE from the 2G SGSN and the security capabilities stored in the UE, the UE judges whether any bidding down attack exists, and then sends an RAU Complete message to the 2G SGSN.

Fifth Embodiment

In this embodiment, the 2G SGSN obtains a root key from the MME, and then deduces AV-related keys according to the obtained root key.

Figure 5:
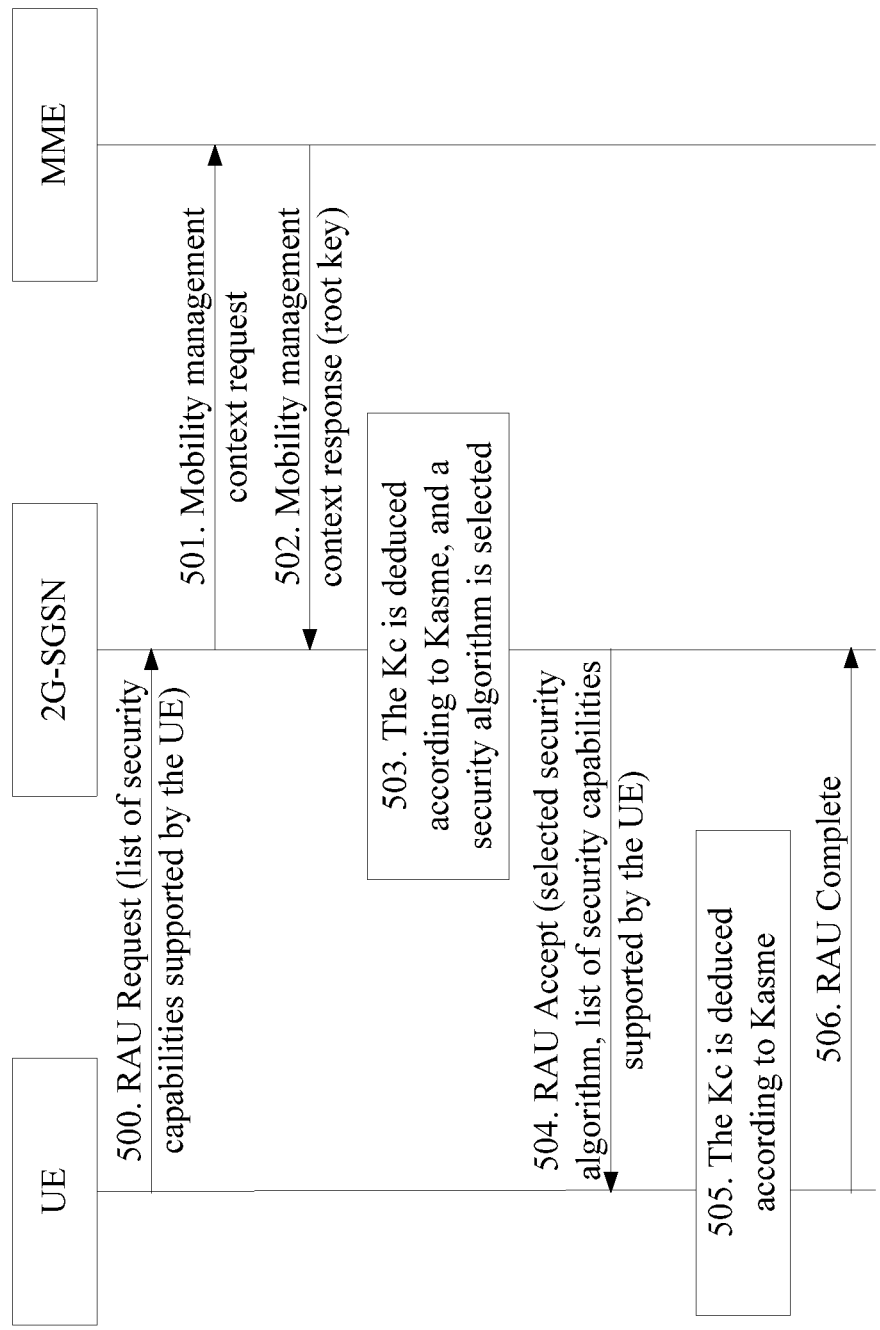
FIG. 5 is a flowchart of a method for negotiating security capabilities during movement of a UE according to a fifth embodiment of the present invention.

FIG. 5 is a flowchart of a method for negotiating security capabilities during movement of a UE according to the fifth embodiment of the present invention. As shown in FIG. 5, the method includes the following steps:

Step 500: The UE sends an RAU Request to the 2G SGSN.

Steps 501-502: The 2G SGSN obtains the root key from the mobility management context response received from the MME.

Specifically, the 2G SGSN sends a mobility management context request to the MME, and the MME returns a mobility management context response that carries the root key to the 2G SGSN.

In step 500, if the RAU Request sent by the UE to the 2G SGSN carries no security capabilities supported by the UE, the mobility management context response returned by the MME to the 2G SGSN in step 502 needs to further carry the security capabilities supported by the UE.

Step 503: The 2G SGSN deduces the AV-related keys according to the obtained root key, and selects security algorithms (including a ciphering algorithm) according to the security capabilities supported by the UE, the security capabilities allowed by the system, and the security capabilities supported by the 2G SGSN.

Steps 504-506 are the same as steps 405-407, and are not repeatedly described.

Sixth Embodiment

In this embodiment, the 2G SGSN obtains the AV-related keys through a 2G re-authentication process.

Figure 6:
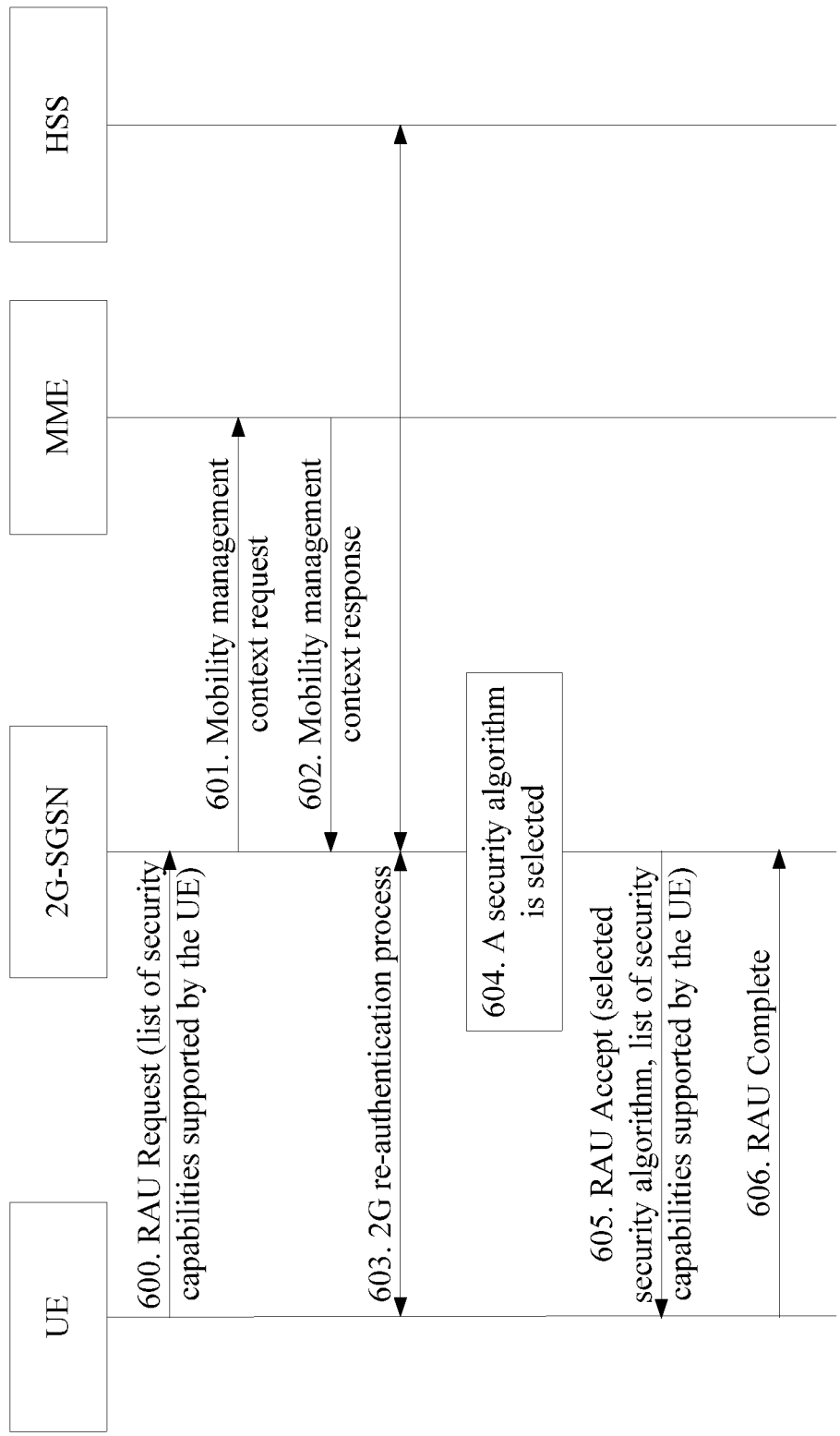
FIG. 6 is a flowchart of a method for negotiating security capabilities during movement of a UE according to a sixth embodiment of the present invention.

FIG. 6 is a flowchart of a method for negotiating security capabilities during movement of a UE according to the sixth embodiment of the present invention. As shown in FIG. 6, the method includes the following steps:

Step 600: The UE sends an RAU Request to the 2G SGSN.

Steps 601-602: The 2G SGSN sends a mobility management context request to the MME, and the MME returns a response that carries the mobility management context to the 2G SGSN.

In step 600, if the RAU Request sent by the UE to the 2G SGSN carries no security capabilities supported by the UE, the mobility management context response returned by the MME to the 2G SGSN in step 602 needs to further carry the security capabilities supported by the UE.

Step 603: The 2G SGSN and the UE obtain the AV-related key (Kc) from the HSS through a 2G re-authentication process.

Steps 604-606: The 2G SGSN selects security algorithms (including a ciphering algorithm) according to the security capabilities supported by the UE, the security capabilities allowed by the system, and the security capabilities supported by the 2G SGSN, and then sends an RAU Accept message to the UE, where the message carries the security capabilities supported by the UE and the selected security algorithm. The UE returns an RAU Complete message to the 2G SGSN.

Figure 7:
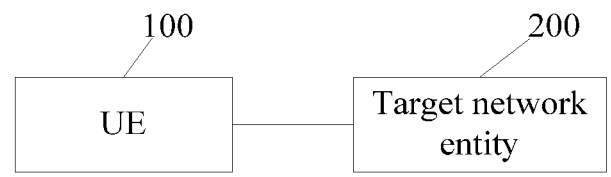
FIG. 7 shows a system for negotiating security capabilities during movement of a UE according to an embodiment of the present invention.

A system for negotiating security capabilities during movement of a UE is provided. As shown in FIG. 7, the system includes a UE 100 and a target network entity 200.

The UE 100 is adapted to: send an RAU Request message to the target network entity 200 when the UE moves from an LTE source network to a 2G/3G target network, receive a selected security algorithm sent by the target network entity 200, and deduce AV-related keys according to a root key of the UE.

The target network entity 200 is adapted to: receive the RAU Request message sent by the UE 100, obtain the security capabilities supported by the UE 100 and the AV-related keys deduced according to the root key, select a security algorithm according to the security capabilities supported by the UE 100, and send the selected security algorithm to the UE 100.

The seventh and eighth embodiments take a 2G system and a 3G system as examples for negotiating security capabilities during movement of the UE.

Seventh Embodiment

Figure 8:
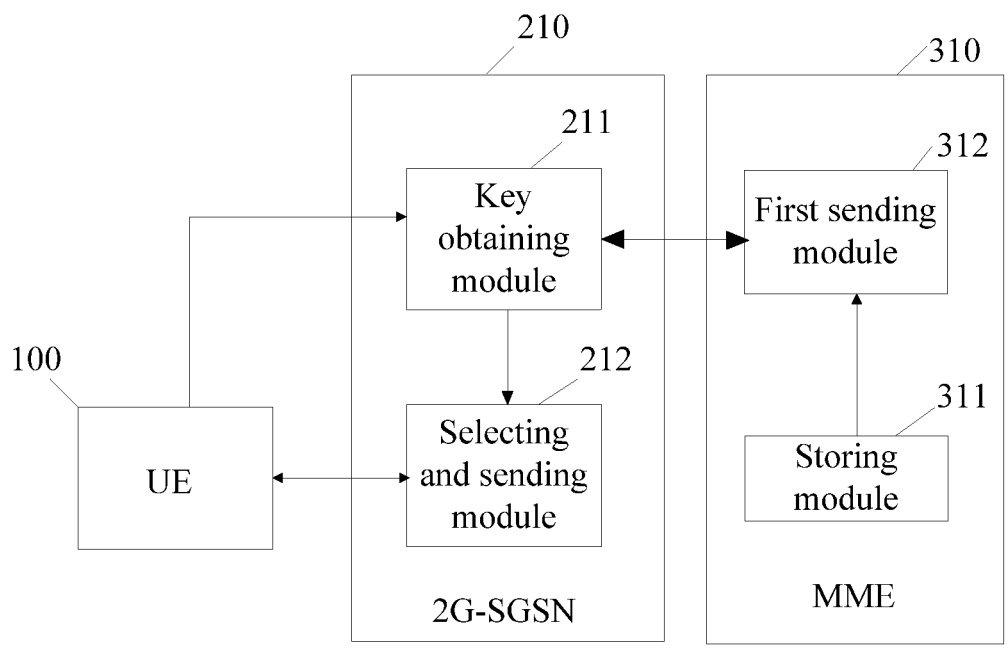
FIG. 8 shows a structure of a 2G system and external connection relations for negotiating security capabilities during movement of a UE according to a seventh embodiment of the present invention.

In a 2G system for negotiating security capabilities during movement of the UE, the target network entity is an SGSN in the 2G network, namely, a 2G SGSN 210. FIG. 8 shows a structure of a 2G system and external connection relations for negotiating security capabilities during movement of a UE according to an embodiment of the present invention. As shown in FIG. 8, the SGSN 210 includes a key obtaining module 211 and a selecting and sending module 212.

The key obtaining module 211 is adapted to: obtain a root key in a mobility management context response from an MME after receiving an RAU Request sent by the UE, and deduce AV-related keys according to the root key.

The selecting and sending module 212 is adapted to: obtain the security capabilities supported by the UE 100, select a security algorithm according to the security capabilities supported by the UE 100, and send the selected security algorithm to the UE 100.

As shown in FIG. 8, the 2G system for negotiating security capabilities during movement of the UE according to this embodiment further includes an MME 310, which is applicable when the UE moves from an LTE source network to a 2G/3G target network. The MME 310 includes a storing module 311 and a first sending module 312.

The storing module 311 is adapted to store a root key.

The first sending module 312 is adapted to send the root key stored in the storing module 311 to the SGSN through a mobility management context response after receiving the mobility management context request sent by the SGSN.

Alternatively, if the key obtaining module 211 is adapted to obtain the AV-related key from the mobility management context response from the MME, where the AV-related key is deduced by the MME according to the root key of the MME, the MME includes a key deducing module and a second sending module. The key deducing module is adapted to deduce AV-related keys according to a root key after receiving a mobility management context request sent by an SGSN. The second sending module is adapted to send the AV-related keys obtained by the key deducing module to the SGSN through a mobility management context response.

Eighth Embodiment

Figure 9:
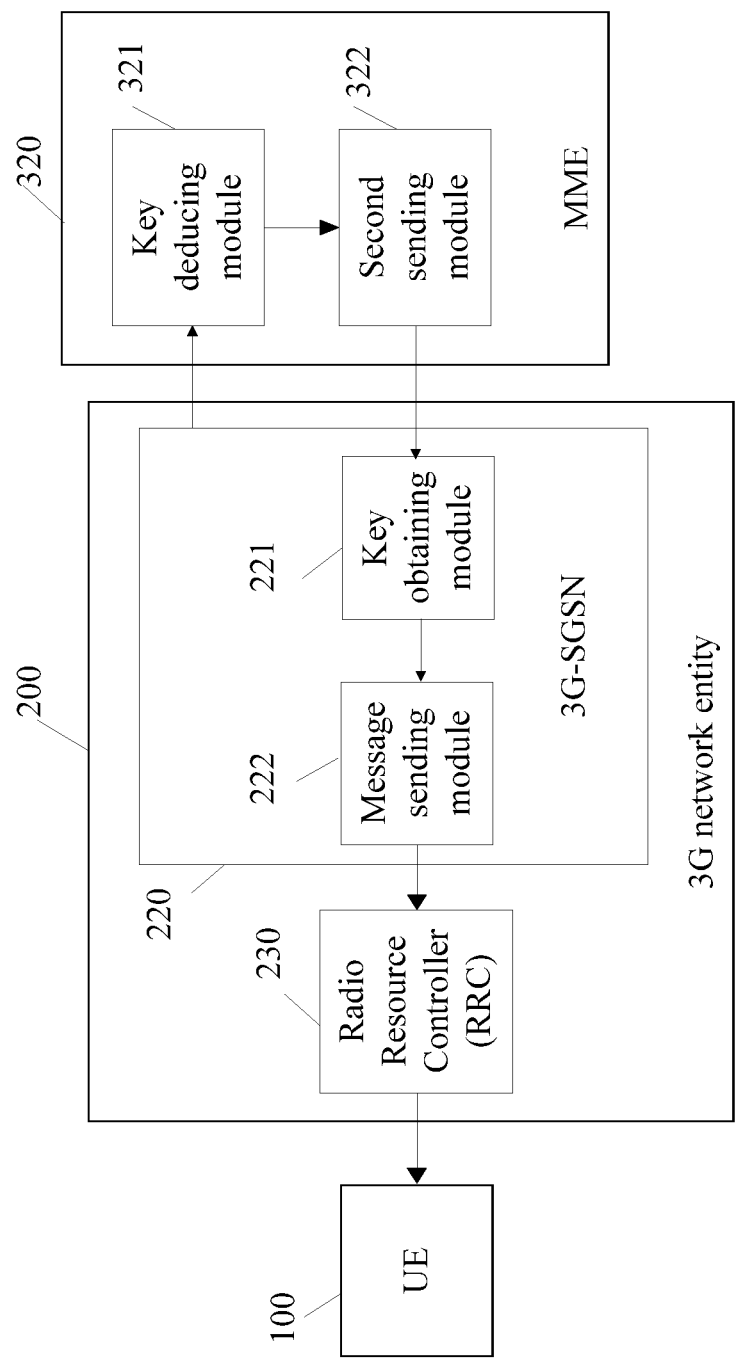
FIG. 9 shows a structure of a 3G system and external connection relations for negotiating security capabilities during movement of a UE according to an eighth embodiment of the present invention.

In the 3G system for negotiating security capabilities during movement of the UE, the target network entities 200 include an SGSN in the 3G network, namely, a 3G SGSN 220, and an RNC 230. FIG. 9 shows a structure of a 3G system and external connection relations for negotiating security capabilities during movement of a UE according to an embodiment of the present invention.

As shown in FIG. 9, the SGSN 220 in the system includes a key obtaining module 221 and a message sending module 222. The key obtaining module 221 is adapted to obtain the AV-related keys from the mobility management context response received from the MME, where the AV-related keys are deduced by the MME according to the root key of the MME. The message sending module 222 is adapted to send an SMC message to the RNC 230 for processing, where the message carries the security capabilities supported by the UE, the security capabilities allowed by the system, and the security key.

Accordingly, the MME 230 in this embodiment includes a key deducing module 321 and a second sending module 322.

The key deducing module 321 is adapted to deduce AV-related keys according to a root key after receiving a mobility management context request sent by an SGSN.

The second sending module 322 is adapted to send the AV-related keys obtained by the key deducing module 321 to the SGSN through a mobility management context response.

As in the seventh embodiment, if the SGSN obtains the root key from the MME directly and deduces the AV-related keys, the MME includes a storing module 311 and a first sending module 312. The storing module 311 is adapted to store a root key. The first sending module 312 is adapted to send the root key stored in the storing module 311 to the SGSN through a mobility management context response after receiving the mobility management context request sent by the SGSN.

An SGSN is provided, which is applicable when a UE moves from an LTE source network to a 2G/3G target network. The ninth and tenth embodiments deal with the SGSN.

Ninth Embodiment

For the scenario where the UE moves from an LTE source network to a 3G target network, this embodiment provides an SGSN. The SGSN includes a key obtaining module, which is adapted to: obtain a root key in a mobility management context response received from an MME and deduce AV-related keys according to the root key.

In other embodiments of the present invention, the key obtaining module is adapted to obtain the AV-related keys from the mobility management context response received from the MME, where the AV-related keys are deduced by the MME according to the root key of the MME.

Tenth Embodiment

The SGSN in this embodiment is applicable when the UE moves from an LTE source network to a 2G target network.

Figure 10:
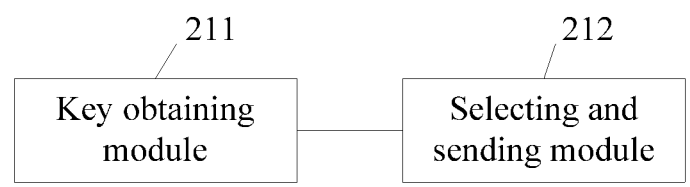
FIG. 10 shows an SGSN according to a tenth embodiment of the present invention.

As shown in FIG. 10, the SGSN includes a key obtaining module 211 and a selecting and sending module 212.

The key obtaining module 211 is adapted to: obtain a root key in a mobility management context response received from an MME and deduce AV-related keys according to the root key.

The selecting and sending module 212 is adapted to: obtain the security capabilities supported by the UE 100, select a security algorithm according to the security capabilities supported by the UE 100, and send the selected security algorithm to the UE 100.

In other embodiments of the present invention, the key obtaining module is adapted to obtain the AV-related keys from the mobility management context response received from the MME, where the AV-related keys are deduced by the MME according to the root key of the MME.

An MME is provided, which is applicable when a UE moves from an LTE source network to a 2G/3G target network.

Eleventh Embodiment

Figure 11:
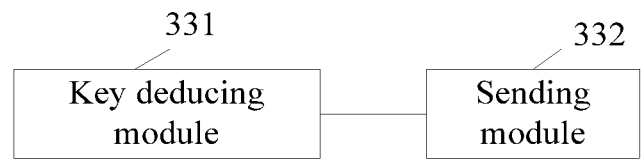
FIG. 11 shows an MME according to an eleventh embodiment of the present invention.

As shown in FIG. 11, if the SGSN obtains the AV-related keys deduced by the MME according to the root key, the MME includes a key deducing module 331 and a sending module 332. The key deducing module 331 is adapted to deduce AV-related keys according to a root key after receiving a mobility management context request sent by an SGSN. The sending module 332 is adapted to send the AV-related keys obtained by the key deducing module 331 to the SGSN through a mobility management context response.

In conclusion, through the technical solution of the present invention, when the UE moves from an LTE source network to a 2G/3G target network, the target network entity receives the RAU Request sent by the UE, and then obtains the security capabilities supported by the UE and the AV-related keys deduced according to the root key; the UE deduces the AV-related keys according to the root key of the UE, thus implementing key negotiation; the target network entity selects a security algorithm according to the security capabilities supported by the UE, and then sends the selected security algorithm to the UE, thus implementing security algorithm negotiation. Therefore, when the UE moves from an LTE source network to a 2G/3G target network, the UE can negotiate security capabilities with the network, thus ensuring security in the subsequent interaction between the UE and the network.

The serial numbers of the embodiments given above are for clear description only, and do not represent the order of preference. The word "step" does not represent the sequence of performing the method in the embodiments of the present invention.

Described above are only exemplary embodiments of the present invention, but not intended to limit the scope of protection of the present invention. Any modification, equivalent replacement, and improvement made without departing from the spirit and principle of the present invention fall within the scope of protection of the present invention.

What is claimed is:

1. A communications system, comprising:
    a mobility management entity (MME) in a long term evolution (LTE) network; and
    a serving general packet radio service (GPRS) support node (SGSN) in a second generation or third generation (2G/3G) network; wherein:

the SGSN is configured to:
  receive a routing area update (RAU) request from a user equipment (UE) in an idle state moving from the LTE network to the 2G/3G network; and
  send a context request according to the RAU request; and
the MME is configured to:
  receive the context request;
  derive authentication vector (AV)-related keys according to a key of the MME; and
  send a context response to the SGSN, wherein the context response comprises the AV-related keys, and the AV-related keys comprise an integrity protection key (IK) and a ciphering key (CK).

2. The system according to claim 1, wherein the system further comprises a radio network controller (RNC) in the 2G/3G network;
the SGSN is further configured to send the AV-related keys; and
the RNC is configured to receive the AV-related keys.

3. The system according to claim 2, wherein:
the SGSN is further configured to send security capabilities allowed by the 2G/3G network; and
the RNC is further configured to receive the security capabilities allowed by the 2G/3G network, select a security algorithm according to the security capabilities allowed by the 2G/3G network, and send the selected security algorithm to the UE.

4. The system according to claim 3, wherein the RAU request carries security capabilities supported by the UE.

5. The system according to claim 3, wherein the context response further comprises security capabilities supported by the UE.

6. The system according to claim 2, wherein the RAU request carries security capabilities supported by the UE.

7. The system according to claim 2, wherein the context response further comprises security capabilities supported by the UE.

8. The system according to claim 1, wherein the RAU request carries security capabilities supported by the UE.

9. The system according to claim 1, wherein the context response further comprises security capabilities supported by the UE.

10. The system according to claim 1, wherein the key of the MME is Kasme.

11. A communications method, comprising:
receiving, by a serving general packet radio service (GPRS) support node (SGSN) in a second generation or third generation (2G/3G) network, a routing area update (RAU) request from a user equipment (UE) in an idle state moving from a long term evolution (LTE) network to the 2G/3G network;
sending, by the SGSN, a context request according to the RAU request;
receiving, by a mobility management entity (MME) in the LTE network, the context request;
deriving, by the MME, authentication vector (AV)-related keys according to a key of the MME; and
sending, by the MME, a context response to the SGSN, wherein the context response comprises the AV-related keys, and the AV-related keys comprise an integrity protection key (IK) and a ciphering key (CK).

12. The method according to claim 11, wherein the method further comprises:
sending, by the SGSN, the AV-related keys; and
receiving, by a radio network controller (RNC) in the 2G/3G network, the AV-related keys.

13. The method according to claim 12, wherein the method further comprises:
sending, by the SGSN, security capabilities allowed by the 2G/3G network;
receiving, by the RNC, the security capabilities allowed by the 2G/3G network;
selecting, by the RNC, a security algorithm according to the security capabilities allowed by the 2G/3G network; and
sending, by the RNC, the selected security algorithm to the UE.

14. The method according to claim 13, wherein the RAU request carries security capabilities supported by the UE.

15. The method according to claim 13, wherein the context response further comprises security capabilities supported by the UE.

16. The method according to claim 12, wherein the RAU request carries security capabilities supported by the UE.

17. The method according to claim 12, wherein the context response further comprises security capabilities supported by the UE.

18. The method according to claim 11, wherein the RAU request carries security capabilities supported by the UE.

19. The method according to claim 11, wherein the context response further comprises security capabilities supported by the UE.

20. The method according to claim 11, wherein the key of the MME is Kasme.

* * * * *